Patented July 25, 1939

2,167,127

UNITED STATES PATENT OFFICE 2,167,127

LACQUER AND ITS PREPARATION

Fritz Seebach, Erkner, near Berlin, Germany, assignor to Bakelite Corporation, New York, N. Y., a corporation of Delaware No Drawing. Application January 23, 1936, Serial No. 60,517. In Germany February 1, 1935

4 Claims. (Cl. 260—30)

Lacquers from phenol-aldehyde condensation products have heretofore been prepared by dissolving in organic solvents. As solvents can be used alcohol, methyl alcohol, oil of turpentine, etc. The lacquers obtained with the aid of these solvents level very well and after air-drying or heat-hardening, show valuable properties. Therefore lacquers from phenol-aldehyde condensation products have found wide distribution and their applications are constantly increasing. It has been suggested that, in place of solutions of phenol-aldehyde resins, their dispersions in water or in aqueous liquids be used. The preparation of such dispersions, however, calls for the addition of foreign bodies, and the known dispersions are not sufficiently homogeneous and lasting to be suitable as substitutes for resin solutions in organic solvents.

It has now been found that phenol-aldehyde resins can be prepared that disperse readily in water or in aqueous liquids and that from these, in turn, dispersions with very good keeping qualities answering all practical requirements by following the procedure described below.

For carrying out the invention, composition products from phenol-aldehyde resins and fatty oils are used as initial materials. The phenol-aldehyde resins may be hardenable resins in A or B condition, or even novolaks. Hardenable resins to be used are, for example, resoles or products from novolaks and hardening agents, in particular hexamethylenetetramine. Especially suited to carrying out the invention have proved to be the products of phenol-aldehyde resins and fatty oils obtained in accordance with German patents, No. 517,445, No. 533,798, No. 587,576, or French Patent No. 690,335. The products can be used with an addition of dyes, pigments, plasticizers, drying accelerators, natural resins, or other synthetic resins. The product-forming substances are incorporated with organic acids before, during, or after combining the resins with the fatty oils, being mixed homogeneously with the homogeneous products of resins and oils; the salts of the acids have a dispersive action. As such acids for example can be used resin acids, for example abietic acid, pimaric acid, fatty acids, oil acids, for instance fatty acids from linseed oil, tung oil or other fatty oils, sulfo acids, for instance castor oil sulphonic acid, furthermore naphthenic acid, having dispersive ability, and the like. The acids may be incorporated with the composition products of fatty oils and phenol-aldehyde resins before, during or after preparation of the composition products.

The products so obtained from fatty oils, dispersion agents and phenol-aldehyde resins are preferably dispersed in alkaline water, for example, by allowing them to run with stirring into water of room or moderately higher temperature, (30 to 40° C.) which has been rendered alkaline by means of ammonia or sodium hydroxide, potash and the like. The dispersions can be run into a mixer (Homogenisiermaschine) or colloidal mill. In water employed for dispersions can be dissolved stabilizers, such as glue or casein. Furthermore, other substances than those described and possessing a dispersive or stabilizing property can be added to the dispersible resins.

Example 1.—500 parts by weight of ammonia-condensed phenol-formaldehyde resin (resole), 500 parts by weight of wood oil, 500 parts by weight of hexalin (cyclohexanol) and 25 parts by weight of wood oil acid, with an addition of a few drops of iodine are heated for 30 minutes to 130° C. The hexaline is removed as completely as possible by distillation in vacuo, but 5 to 10% hexaline can be allowed to remain in the resin product. The mass is heated to a thin liquid and under stirring is allowed to run into 1000 to 2000 parts of water in which 15 to 20 parts of concentrated ammonia has been dissolved. The application of these dispersions give lacquer films that are heat-hardening. An air-drying lacquer film can be obtained by adding to the product obtained from oil, resin and oil acid before dispersion, some manganese borate in solution as a drying accelerator.

Example 2.—500 parts by weight of resole from alkali-condensed technical cresol and formaldehyde, 500 parts by weight of wood oil and 1000 parts by weight of acetic acid anhydride are boiled at about 120–130° C. for two hours under reflux; the acetic acid that is formed and the unconverted acetic acid anhydride are distilled off in vacuo as completely as possible. The remaining product is melted with 20 parts oleic acid and then the mass is stirred into 2000 to 3000 parts of water containing 20 to 30 parts ammonia. This dispersion lacquer yields air-drying coatings.

In the application of the dispersion lacquers obtained according to the invention when no pigments are added, the coatings are at first opaque but become transparent after evaporation of the water. The resulting lacquers can be used for the coating of any bases, for the impregnation of fibrous materials, porous webs, for the preparation of molding mixtures, grinding implements as abrasive paper, and in short for all purposes for which solutions of phenol-aldehyde resins in organic solvents have heretofore been used. Depending upon the requirements which the lacquer films are designed to meet and upon the quality of the materials employed, the layers or products remaining after evaporation of the water are either air-drying or require heat-hardening.

Obviously such additions as dyes or fillers can be incorporated in the finished lacquer-suspensions.

The term "lacquer" as used in my application covers any compositions which are solutions or dispersions of composition products from phenol-aldehyde resins and fatty oils in volatile liquids and may be used for coating impregnating and other purposes.

The organic acids which, according to my invention, are incorporated with the artificial resins, while being dispersed in alkaline liquids, will form salts and probably the stability of the dispersion is caused or improved by said salts.

The proportions of the phenolaldehyde resin, the fatty oils and the emulsifying acid may vary to a wide extent within the scope of my present invention. As a rule about equal parts of phenolic resin and fatty oil are used and about 1-5% of the emulsifying acid calculated on the weight of the resin-oil product. The concentration of the alkali in the emulsifying aqueous liquid may also vary and amounts generally to 1-5% of ammonia ($NH_3$) or equivalent quantities of any other base calculated on the water.

The dispersions as prepared in accordance with my present invention are exceedingly homogeneous and above all very stable. It is therefore possible to prepare the dispersion in a factory and to forward the ready made dispersion. The dispersion can be very readily effected and only requires the mixing of the heated resin with the dispersing liquid. The coatings yield a hard and clear film showing excellent stability and adhesion to the base.

What I claim is:

1. Process of making an aqueous dispersion of a phenol-aldehyde resin and wood oil suitable for use as a lacquer which comprises heating about equal parts of the resin and the wood oil together with a wood oil acid in the presence of cyclohexanol, distilling off at least a part of the cyclohexanol, and passing the product in the form of a heated liquid into water made alkaline.

2. Process of making an aqueous dispersion of a phenol-aldehyde resin and a fatty oil suitable for use as a lacquer which comprises heating in a high boiling solvent the resin and the oil together with an organic acid forming with an alkali a salt having a dispersive action, distilling off at least part of the solvent and passing the product into water made alkaline.

3. Process of making a composition of a phenol-aldehyde resin and a fatty oil readily dispersible in an alkaline aqueous liquid which comprises heating in a high boiling solvent the resin and the oil together with an organic acid forming with an alkali a salt having a dispersive action.

4. Composition dispersible in an alkaline aqueous liquid comprising a homogeneous product in a high boiling solvent of a phenol-aldehyde resin, a fatty oil and an organic acid forming with an alkali a salt having a dispersive action.

FRITZ SEEBACH.